United States Patent [19]

Gabrielson

[11] 4,172,388
[45] Oct. 30, 1979

[54] DIFFERENTIAL PRESSURE SENSOR WITH DUAL LEVEL OVERRANGE PROTECTION

[75] Inventor: Birger B. Gabrielson, Naugatuck, Conn.

[73] Assignee: American Chain & Cable Company, Inc., Bridgeport, Conn.

[21] Appl. No.: 885,079

[22] Filed: Mar. 9, 1978

[51] Int. Cl.² .............................................. G01L 9/06
[52] U.S. Cl. ...................................... 73/721; 73/706; 73/708; 338/4; 338/42
[58] Field of Search ............ 73/708, 717, 720, 205 R, 73/141 A, 721, 726, 727, 706, 777; 338/4, 42

[56] References Cited

U.S. PATENT DOCUMENTS

| | | |
|---|---|---|
| 3,343,420 | 9/1967 | Kondo et al. ........................... 73/720 |
| 3,440,872 | 4/1969 | Stedman ............................. 73/141 A |
| 3,780,588 | 12/1973 | Whitehead et al. ..................... 73/720 |
| 4,051,451 | 9/1977 | Kurtz et al. ......................... 73/141 A |
| 4,058,788 | 11/1977 | Andrews et al. ....................... 73/720 |

Primary Examiner—Donald O. Woodiel
Attorney, Agent, or Firm—Pennie & Edmonds

[57] ABSTRACT

A differential pressure sensor comprises a pressure-to-displacement transducer resiliently coupled to a cantilever beam strain gauge arrangement. The pressure-to-displacement transducer is provided with overrange protection permitting substantial displacement in the range of measurable pressure differentials and the more fragile cantilever beam is provided with separate overrange protection more narrowly constraining its displacement. The resilient coupling between the transducer and the beam absorbs the displacement differential. As a consequence of this structure, the device can provide high sensitivity readings in the measurable range of pressure differentials and is protected against pressure differentials greatly in excess of the measurable range.

5 Claims, 1 Drawing Figure

DIFFERENTIAL PRESSURE SENSOR WITH DUAL LEVEL OVERRANGE PROTECTION

BACKGROUND OF THE INVENTION

The present invention relates to a differential pressure sensor and, in particular, to a pressure sensor provided with a dual level of overrange protection in order to permit high sensitivity in the measurable range while providing reliable overrange protection against pressure differentials greatly exceeding the measurable range.

The conflicting requirements of high sensitivity and reliable overrange protection have long been a problem in the design of differential pressure sensors. In typical applications, high sensitivity requires the conversion of pressure differentials into substantial displacements whereas overrange protection requires sturdy components resistant to substantial displacement. Numerous proposals have been advanced for compromising these inconsistent requirements but none have proven completely satisfactory. Accordingly, there is a need for a new approach in the design of such sensors which can simultaneously provide high sensitivity and reliable protection.

SUMMARY OF THE INVENTION

In accordance with the invention, a differential pressure sensor comprises a pressure-to-displacement transducer resiliently coupled to a cantilever beam strain gauge arrangement. The pressure-to-displacement transducer is provided with overrange protection permitting substantial displacement in the range of measurable pressure differentials and the more fragile cantilever beam is provided with separate overrange protection more narrowly constraining its displacement. The resilient coupling between the transducer and the beam absorbs the displacement differential. As a consequence of this structure, the device can provide high sensitivity readings in the measurable range of pressure differentials and is protected against pressure differentials greatly in excess of the measurable range.

BRIEF DESCRIPTION OF THE DRAWINGS

The nature, advantages, and various features of the invention will appear more fully upon consideration of the illustrative embodiments now to be described in detail in connection with the accompanying drawing (FIGURE 1) which is a schematic cross section of a differential pressure sensor in accordance with the invention.

DETAILED DESCRIPTION OF THE DRAWING

Figure 1:
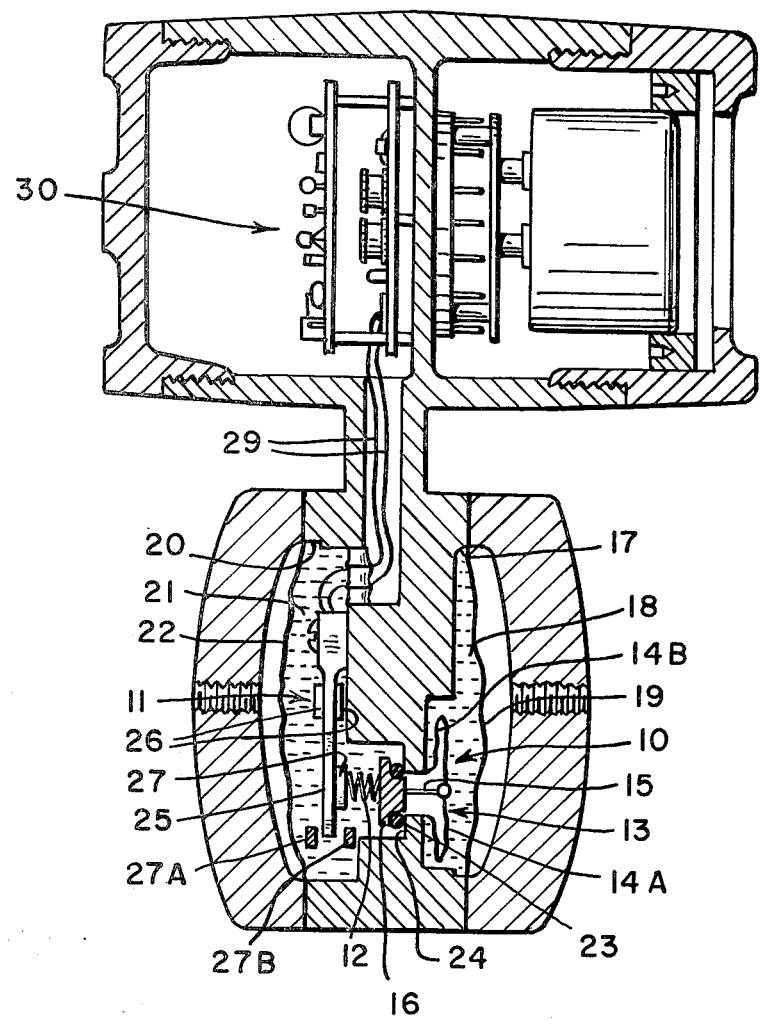

Referring to the drawing, FIG. 1 illustrates a differential pressure sensor comprising a pressure differential-to-displacement transducer 10, a cantilever beam strain gauge arrangement 11, and resilient coupling means such as spring 12. The transducer and the cantilever beam are provided with separate overrange protective means as will be described in greater detail hereinbelow.

In the preferred arrangement, transducer 10 comprises bellows 13 made up of flexible, corrugated metal diaphragms 14A and 14B capable of nesting against one another when collapsed, a rigid rod member 15, and a piston member 16. The exterior of bellows 13 is coupled to one source of pressure to be differentially measured (preferably the low pressure source) via a chamber defined by walls 17 filled with incompressible dielectric fluid 18, and an isolation membrane 19. The interior of the bellows is coupled to the other source of presssure (preferably the high pressure source) via a chamber 20 also filled with fluid 21, and an isolation membrane 22.

In a preferred specific embodiment of the FIG. 1 device, metal diaphragms 14A and 14B are made of a material having a substantially constant temperature coefficient of elasticity such as the alloy Ni-Span-C marketed by the International Nickel Company. Typical thickness of this material can range from about 0.006 inch to 0.0010 inch, depending on the range of pressure differentials to be measured. The dielectric fluid can be a silicone dielectric fluid such as Dow-Corning 200 Dielectric Fluid, and both the chamber walls and isolating diaphragms can be fabricated from type 316 stainless steel, the diaphragm having a typical thickness on the order of 0.003 inch.

Spring 12 is also preferably made of the aforesaid Ni-Span-C alloy.

In operation of the transducer, a higher differential pressure in chamber 20 expands the bellows 13 and displaces rod 15 and piston 16 toward chamber 17 in a manner which is substantially linear with increasing pressure. The transducer is provided with overrange protection in the form of an O-ring seal 23 on piston 16 which seals against shoulders 24 in chamber 20 when the differential pressure in chamber 20 exceeds a predeterminable level. The transducer is protected against overrange differential pressures in chamber 17 by the fact that diaphrams 14A and 14B will nest against one another upon collapse and prevent further displacement of rod 15.

Cantilever beam strain gauge arrangement 11 preferably comprises a resilient cantilever beam 25 and a pair of semiconductor strain gauges 26 disposed on either side of the beam in the direction of displacement. In a preferred specific embodiment, the strain gauge arrangement is a commercially available unit marketed by Kistler-Morse Co. under the trade designation, Deflector Sensor Cartridge #DFC-6BB4-110AB. This unit is modified to include a dielectric projection 27 for mechanically coupling to spring 12.

In operation, within the range of measurable pressure differentials, displacement of piston 16 produces, through coupling spring 12, a corresponding displacement of the beam, with the consequence that gauges 26 sense a strain differential which produces a corresponding electrical signal that can be taken out through lead wires 29 and processed for transmission by circuitry 30 in accordance with principles and circuits well-known in the art.

The cantilever beam is provided with separate overrange protection preferably in the form of stops 27A and 27B. In practice, these stops constrain the displacement of the beam to a narrower range than the permissible range of displacement for the rod and piston. The resilient coupling spring absorbs the displacement differential. The invention may be more clearly understood by reference to the following description of the main parameters of a specific device for sensing pressure differentials in the range between 0 and 120 inches of water. In this device, the bellows is made of approximately 0.006 inch thick Ni-Span-C alloy and has a pressure effective area of about 0.45 square inch. It has a spring rate of approximately 140 lbs./inch. The isolating diaphragms have an area of about 3 square inches and a spring rate of about 40 lbs./inch. The coupling spring 12 has a spring rate of about 180 lbs./inch. In operation, the bellows has a full scale deflection displacement of about 0.011 inch and the cantilever beam displaces about 0.009 inch. The overrange protection stops are designed to constrain the transducer displacement within about 0.030 inches and the cantilever beam within the narrower range within about 0.011 inches.

The result is a device which can provide high sensitivity readings in a range of low level pressure differentials and still provide overrange protection against high level pressure differentials greatly in excess of that range. The aforesaid exemplary device for sensing pressure differentials in the range from 0 to 120 inches of water provides overrange protection against pressures up to 6000 p.s.i.

While the invention has been described in connection with a small number of specific embodiments, it is to be understood that these are merely illustrative of the many other specific embodiments which can also utilize the principles of the invention. For example, while the device has been described using a bellows-type pressure-to-displacement transducer, it is clear that any other type of displacement transducer could be substituted for the bellows with the same reliable, sensitive measurement of the displacement produced by the transducer. The transducer could even respond to a condition other than pressure, e.g., temperature, to produce a sensor of that condition. Thus, numerous and varied devices can be made by those skilled in the art without departing from the spirit and scope of the present invention.

I claim:

1. A differential pressure sensor comprising:
   a pressure-to-displacement transducer for producing a displacement substantially proportional to a pressure differential to be measured.
   cantilever beam strain gauge means for producing an electrical output indicative of the deflection of said beam;
   resilient means mechanically coupling said transducer to said cantilever beam for deflecting said beam in response to displacement of said transducer;
   displacement limiting means for limiting the maximum displacement produced by said transducer;
   displacement limiting means for limiting the maximum deflection of said cantilever beam, wherein the maximum displacement of said beam at the region of coupling with said transducer is less than the maximum displacement of said transducer.

2. A differential pressure sensor according to claim 1 wherein said pressure-to-displacement transducer comprises a bellows of flexible corrugated metal diaphragms capable of nesting against one another in the collapsed position in order to limit the maximum displacement upon collapse due to overrange pressure differentials.

3. A differential pressure sensor according to claim 1 wherein said pressure-to-displacement transducer comprises:
   a bellows of flexible corrugated diaphragms capable of nesting against one another in the collapsed position in order to limit maximum displacement upon collapse due to overrange pressure differentials;
   a rigid rod member; and
   a piston member disposed within a shouldered chamber in order to limit maximum expansion of said diaphragm due to overrange pressure differentials.

4. A differential pressure sensor according to claim 1 wherein said resilient means comprises a spring.

5. A sensing device for sensing a parameter to be measured comprising:
   a displacement transducer for producing a displacement substantially proportional to such parameter;
   displacement limiting means for limiting the maximum displacement produced by said transducer;
   cantilever beam strain gauge means for producing an electrical output indicative of the deflection of said beam;
   resilient means mechanically coupling said transducer to said cantilever beam at a region of coupling for deflecting said beam in response to the displacement of said transducer; and
   displacement limiting means for limiting the maximum deflection of said cantilever beam such that the maximum displacement at the region of coupling with said transducer is less than the maximum displacement of said transducer.

* * * * *